United States Patent [19]
Halais

[11] Patent Number: 5,322,267
[45] Date of Patent: Jun. 21, 1994

[54] DAMPER DEVICE, IN PARTICULAR FOR RAILROAD VEHICLES

[75] Inventor: Pierre Halais, Noisy Le Grand, France

[73] Assignee: GEC Alsthom SA, Paris, France

[21] Appl. No.: 980,739

[22] Filed: Nov. 24, 1992

[30] Foreign Application Priority Data

Nov. 27, 1991 [FR] France ................... 91 14637

[51] Int. Cl.[5] ............................ B60G 11/08
[52] U.S. Cl. ..................... 267/246; 267/165
[58] Field of Search ........... 267/229, 244, 245, 246, 267/247, 36.1, 51, 260, 262, 47, 158, 164, 165

[56] References Cited

U.S. PATENT DOCUMENTS

| | | | |
|---|---|---|---|
| Re. 23,401 | 8/1951 | Vancoppenolle | 267/246 X |
| 245,447 | 8/1881 | Chittenden | 267/165 X |
| 701,631 | 6/1902 | Sherman | 267/246 X |
| 1,142,817 | 6/1915 | Kirk | 267/164 X |
| 1,953,050 | 3/1934 | Jandus | 293/55 |

FOREIGN PATENT DOCUMENTS

| | | | |
|---|---|---|---|
| 631061 | 11/1961 | Canada | 267/164 |
| 413978 | 5/1925 | Fed. Rep. of Germany | 267/47 |
| 446174 | 6/1927 | Fed. Rep. of Germany . | |
| 3920993 | 1/1991 | Fed. Rep. of Germany . | |
| 27783 | 12/1896 | United Kingdom | 267/165 |
| 304852 | 1/1929 | United Kingdom | 267/47 |

Primary Examiner—Robert J. Oberleitner
Assistant Examiner—Lee W. Young
Attorney, Agent, or Firm—Sughrue, Mion, Zinn, Macpeak & Seas

[57] ABSTRACT

A damper device, in particular a damper device for railroad vehicles, comprises at least one set of two curved beams articulated to each other, disposed transversely relative to the direction of impact and joined together at their ends so that their concave sides face each other.

11 Claims, 5 Drawing Sheets

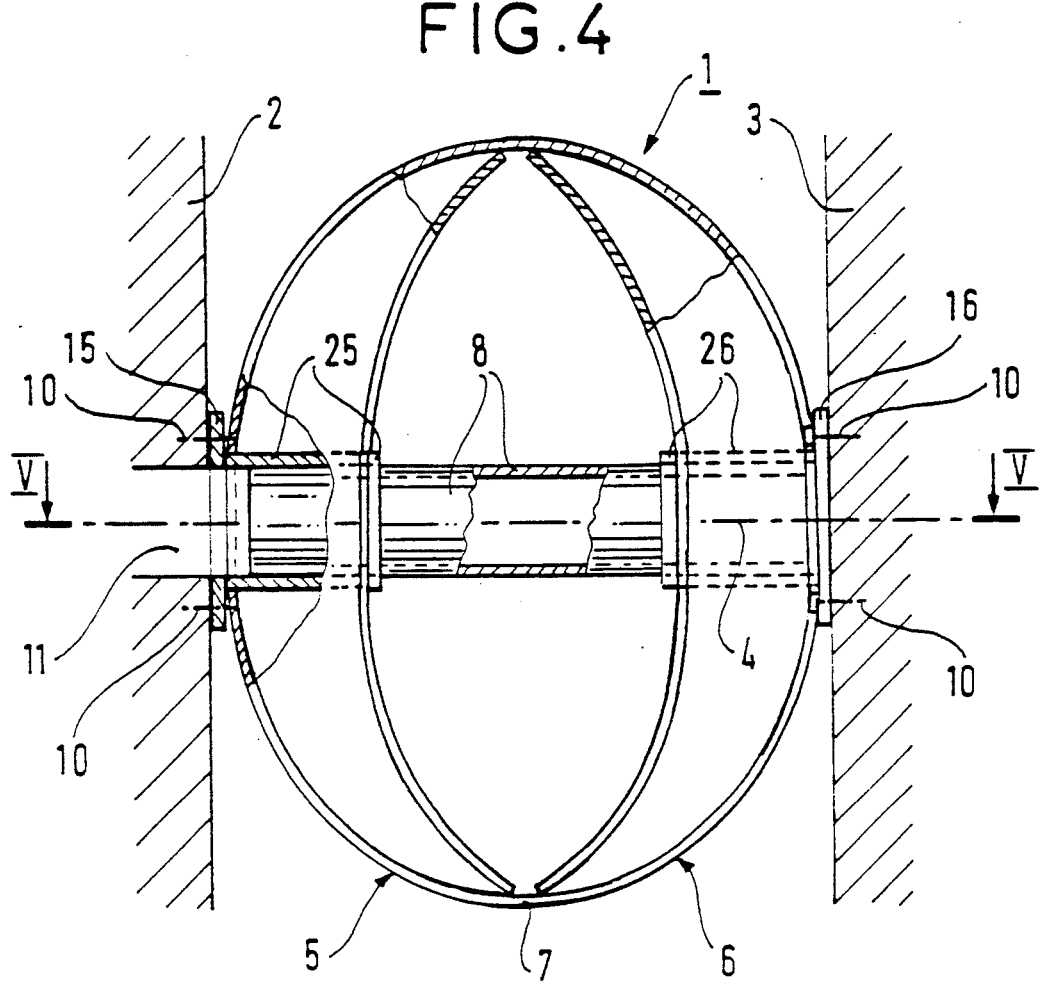
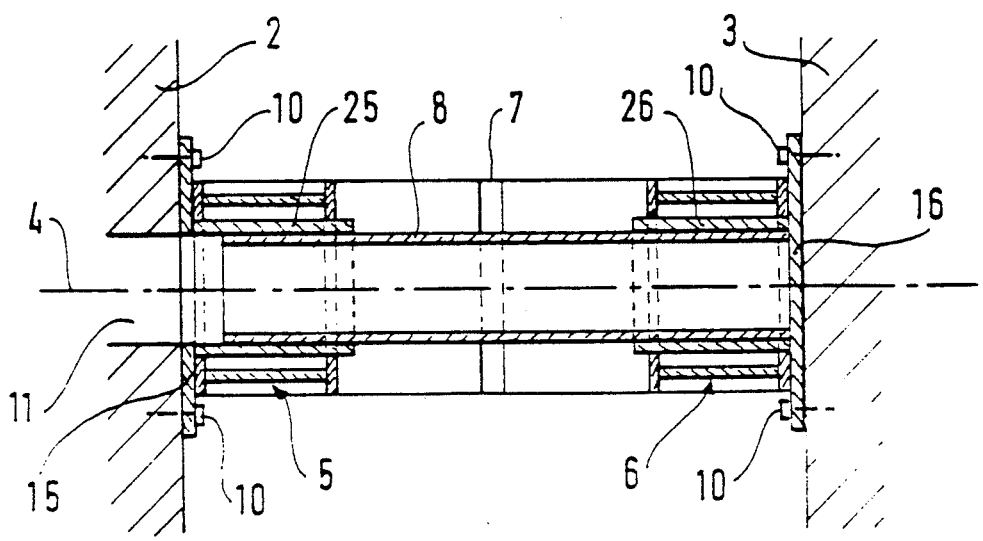

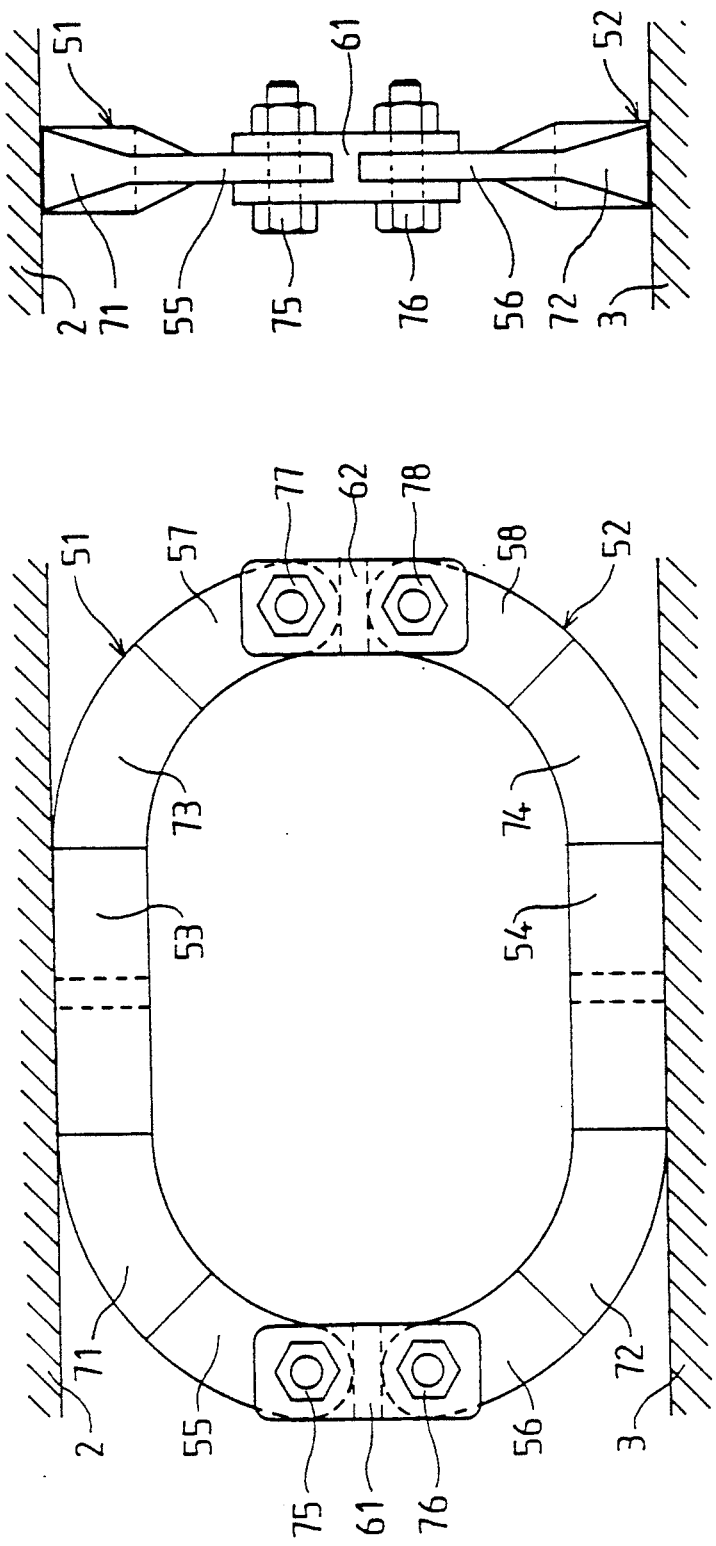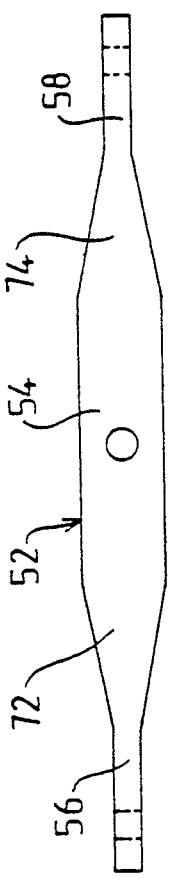

DAMPER DEVICE, IN PARTICULAR FOR RAILROAD VEHICLES

BACKGROUND OF THE INVENTION

1. Field of the Invention

The present invention concerns a damper device, in particular a damper device for railroad vehicles.

2. Description of the Prior Art

Known in the prior art are damper devices comprising reversible deformation systems based on dissipation of energy by dry or viscous friction. In the railroad field they are installed in the buffers and in automatic couplings. These systems have the drawback of a low energy absorption capability, around 50 kJ per unit.

Another damper device is the shield placed on a locomotive, in particular the locomotive of a high speed train, to protect the driver. The shield comprises a honeycomb or tubular structure operative in compression. The energy absorption capability is high (around 2 000 kJ in total). This is a separately attached and bulky component which has the drawback of not contributing to the transmission of longitudinal forces in the chassis.

A device in accordance with the invention can alleviate these drawbacks. It has a high energy absorption capacity, in theory equivalent to that of the shield. It can be installed in the thickness of the vehicle chassis and so constitute one of the members transmitting longitudinal forces in the chassis.

SUMMARY OF THE INVENTION

The present invention consists in a damper device, in particular a damper device for railroad vehicles comprising at least one set of two curved beams articulated to each other, disposed transversely relative to the direction of impact and joined together at their ends so that their concave sides face each other.

The advantage of this form of construction is that it facilitates adaptation of the damper device to the strength of the members constituting the vehicle because the system is inherently modular. It is therefore possible to fit a plurality of sets of beams in series and/or in parallel widthwise or heightwise, as required.

The beams may be hollow beams.

The beams may advantageously have shapes of equal resistance in bending.

Two beams of a set may be articulated together by a flexible blade each end of which is fastened to one beam. This implementation has the advantage of requiring no maintenance or lubrication.

The articulation may be provided by a hinge pin joining the two beams. Given the loads applied in the railroad field, this has the advantage of being very strong.

The articulation may be provided by an intermediate member articulated to each beam.

A set may comprise guide means whereby, in the event of an impact, the system is crushed along a predetermined crushing axis. The guide means may comprise a slide member fastened to one beam and able to slide in a sheath fitted to the other beam.

The invention will be better understood and other advantages and features of the invention will emerge from the following description given by way of non-limiting example with reference to the appended drawings.

BRIEF DESCRIPTION OF THE DRAWINGS

FIGS. 4 and 5 are more detailed views of this second variant.

FIG. 7 through 9 are more detailed views of a third variant of a damper device in accordance with the invention.

DETAILED DESCRIPTION OF THE INVENTION

Figure 1:
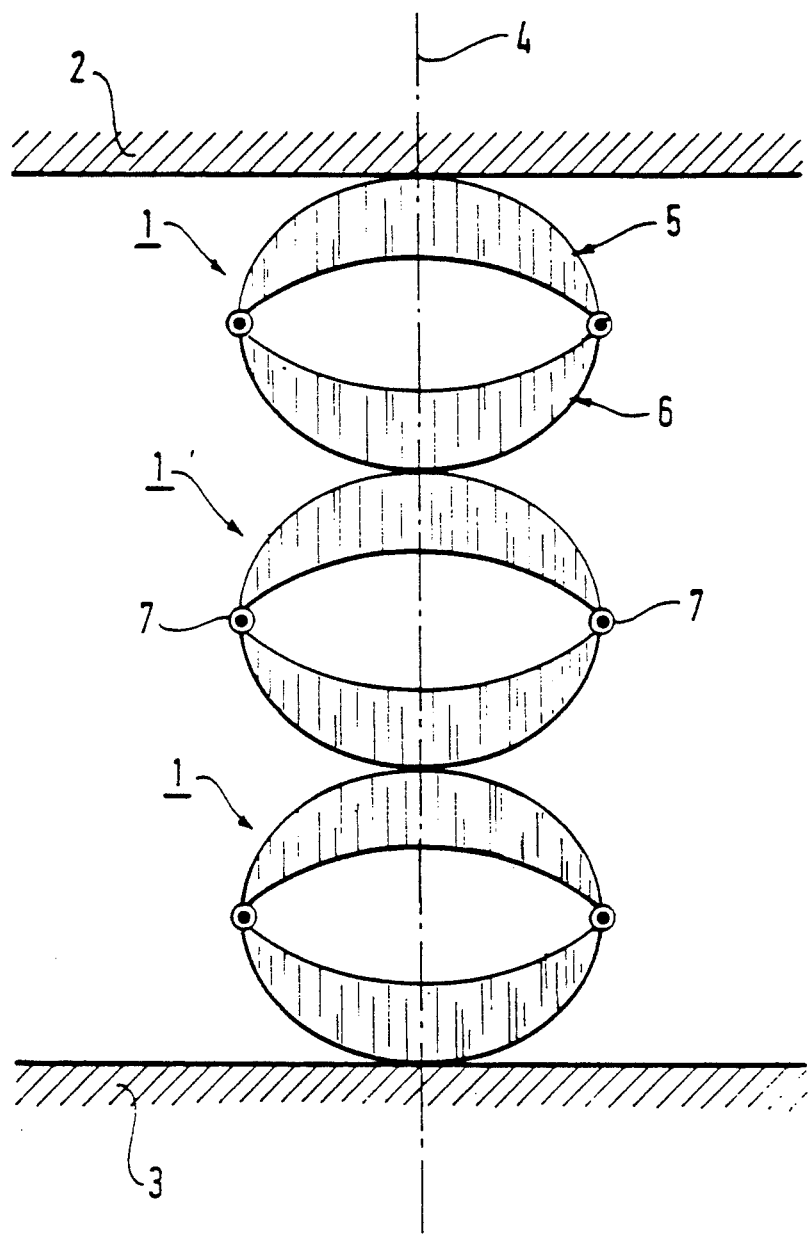
FIG. 1 shows a damper device in accordance with the invention.

Referring to FIG. 1, the damper device comprises three sets 1 of curved beams disposed in series between a first wall 2 and a second wall 3. The sets 1 are aligned along the axis 4 which indicates the direction in which an impact may occur. Each set 1 comprises two curved beams 5 and 6. Each beam is formed by transversely spaced arcuate radially inner and outer walls and joined together by spaced planar top and bottom walls with said arcuate radially inner wall having a larger radius of curvature than that of the arcuate radially outer wall to form a cross-section which varies from a maximum at the crushing axis 4 at the longitudinal center of each beam, to a minimum at the ends. The variation in the beam cross-section is advantageously chosen to confer upon them a shape of equal resistance in bending. In each set the beams are articulated together at their ends by articulations 7.

The articulations may be provided by hinge pins or any other system providing a hinge effect. The type of articulation is chosen according to the loads that the device is required to withstand.

A set may be crushed totally along the compression axis 4 without any member breaking. The beams deform progressively.

Each set of two beams may be fixed rigidly to an adjacent similar set. The resulting device is fixed rigidly to the walls 2 and 3 which transmit the loads. The fixings may be of the nut and bolt, rivet or weld type. To facilitate fixing it may be necessary to attach to the beams fixtures offering a larger fixing surface area.

It is advantageous to use for the beams profiles whose transverse moment of inertia varies and is defined in relation to a required elastic/plastic bending characteristic on crushing. The profiles may be hollow, for example of square or rectangular cross-section.

The metal used to make the beams advantageously has a good capacity for plastic deformation. It may be steel. Some aluminum alloys having this property may suit. The beams are fabricated by welding separate elements together, for example.

Figure 2:
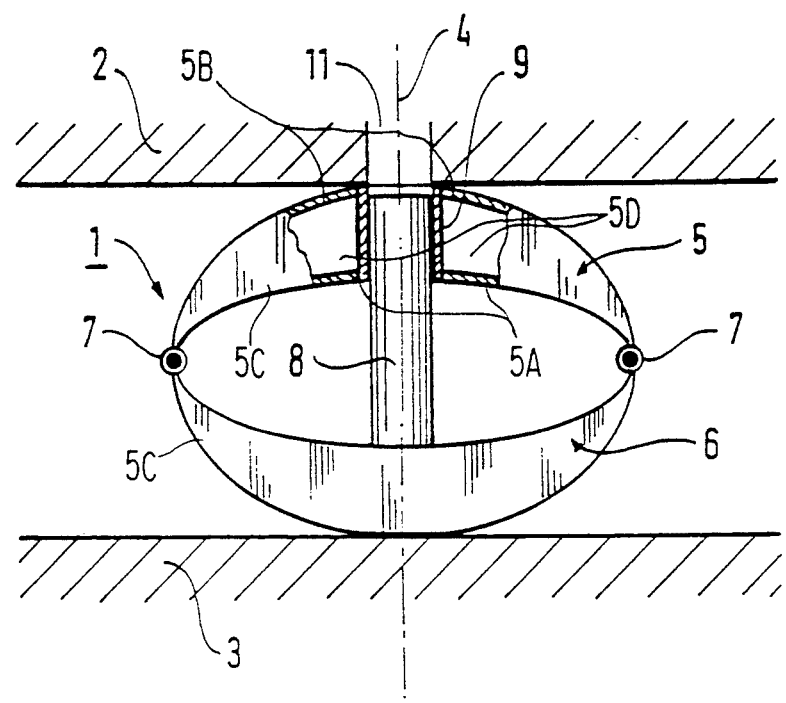
FIG. 2 shows a first variant of a damper device in accordance with the invention.

The device shown in FIG. 2 further comprises a circular cross-section slide member 8 fastened to the beam 6. The beam 5 is fitted with a cylindrical sheath 9 sized to and receiving the slide member to guide it when the set is crushed. The wall 2 is also provided with a hole 11 sized to slide member 8 to enable relative movement of the slide member 8 into hole 11. This arrangement makes the device more effective if the impact is offset slightly from the axis 4. The beam 5, FIG. 2, is a hollow structure formed by a radially inner wall 5A having a larger radius of curvature than that of a radially outer wall 5B. The beam 5 is completed by a planar top wall 5C and a correspondingly sized and shaped bottom wall 5D. The sheath 9 penetrates through the beam 5 and extends from the radially inner arcuate wall 5A through the arcuate radially outer wall 5B.

Figure 3:
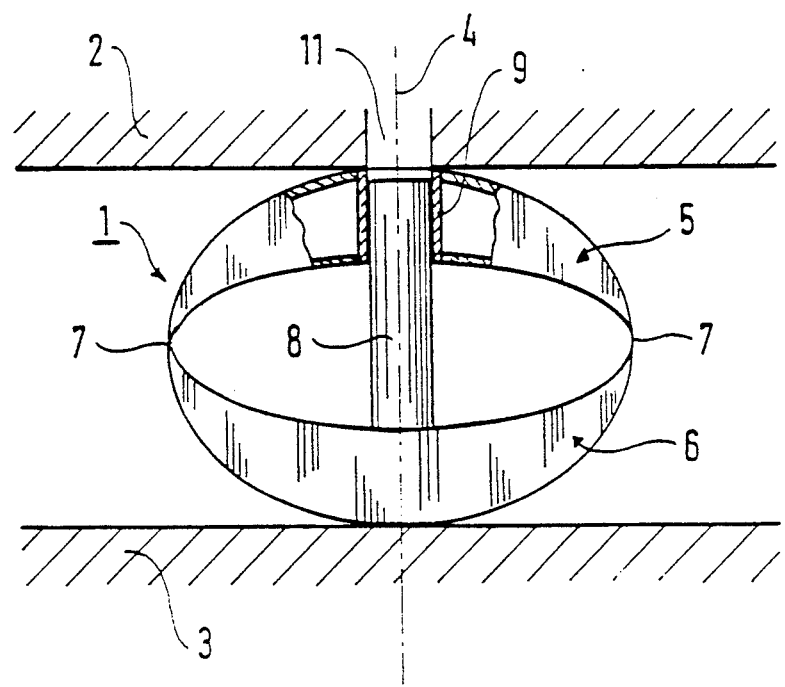
FIG. 3 shows a second variant of a damper device in accordance with the invention.

In the FIG. 3 variant the articulation 7 is a plate used as a plastic hinge, the set 1 possibly comprising in this case a single welded part.

FIGS. 4 and 5 show this latter variant. In these figures the axes 10 are the axes of the bolts or rivets fixing the device to the bearing surfaces 2 and 3. The hollow beams 5 and 6 are of rectangular cross-section and comprise an external blade 80 welded thereto. Each articulation 7 may be provided by the continuity of an external blade 80 common to the two beams ,having integral outer blade portions 80A, 80B, the internal blades 82, 84 being welded to this common external blade 80 slightly short of the articulation 7. Fixtures 15 and 16 attached to the beams 5 and 6 facilitate the attachment of the beam to the walls 2 and 3. The beams 5 and 6 comprise a hole along the axis 4 to enable sheaths 25, 26 to be fitted. The sheath 26 of the beam 6 receives a slide member 8 which is in the form of a tube. The sheath 25 of the beam 5 guides the slide member 8 which may enter axially aligned hole 11 in wall 2.

Figure 6:
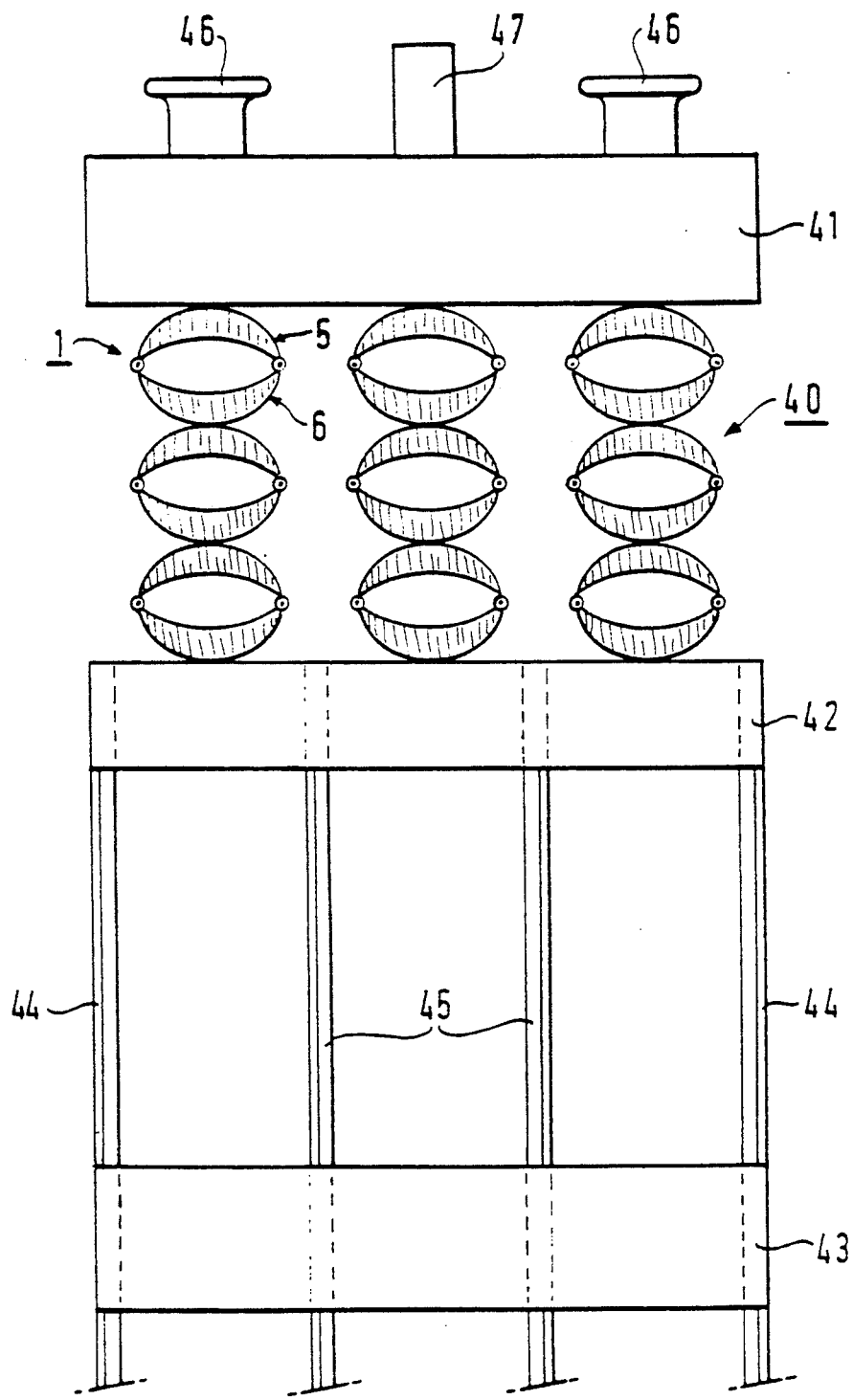
FIG. 6 is a plan view of a damper device in accordance with the invention used to transmit longitudinal forces in a vehicle chassis.

FIG. 6 shows the direct integration of a device in accordance with the invention into a railroad vehicle chassis structure. The device then constitutes one of the members transmitting longitudinal loads. The energy absorber device 40 comprises a plurality of sets 1 of beams in series and in parallel. It is disposed between a head crossbeam 41 and a distributor crossbeam 42. Other parts of the chassis are also shown in part: a secondary crossbeam 43, longitudinal beams 44 and other longitudinal profiles 45.

One advantage of a device in accordance with the invention is that it can be integrated into the structure of the vehicle. A crossbeam of the chassis may be replaced with the energy absorber device which avoids any waste of space. The device may be placed behind the members of the vehicle which by their nature are exposed to impact, such as the buffers 46 and the coupling 47. It may also be disposed elsewhere than at the ends of the body and in particular at the sides, in the lower parts thereof.

FIG. 7 through 9 show another variant of a device in accordance with the invention. In this example the beams 51 and 52 are joined together by intermediate articulation members 61 and 62. Each beam has a central part 53, 54 adapted to be fixed to a wall 2, 3 or to another set. The beams end at smaller cross-section extremities 55, 57 and 56, 58 joined to the central part by changing cross-section parts 71, 73 and 72, 74.

FIG. 9 is a plan view of the beam 52 as seen in the direction of the arrow in FIG. 7.

The beams are articulated to the members 61 and 62 by nuts and bolts 75, 77 and 76, 78 enabling the beams to stretch without breaking in the event of crushing.

There is claimed:

1. Damper device, comprising at least one set of two curved beams, each of said curved beams comprising transversely spaced arcuate, radially inner and outer walls joined together by spaced top and bottom walls, said radial inner wall having a larger radius of curvature than that of said radially outer wall, said two curved beams of said at least one set being joined together at their ends respectively by articulations with concave sides thereof facing each other and said at least one set of two curved beams being disposed transversely relative to a direction of impact through a compression axis at right angles to a plane extending between said articulations with each beam having a rectangular cross section which varies from a maximum at said crushing axis centered between said articulations to said ends, whereby said damper device may be crushed totally along the compression axis without breakage of said beams.

2. Device according to claim 1 wherein said beams are hollow.

3. Device according to claim 1 wherein said beams have shapes of equal resistance in bending.

4. Device according to claim 1 wherein said articulations between the two beams of a set are provided by a flexible blades and each end of each blade being fastened to a respective oppositely concave beam.

5. Device according to claim 1 wherein articulations between the two beams of a set are provided by hinge pins joining together the two beams at respective opposite ends.

6. Device according to claim 1 wherein an articulation between the two beams of a set is provided by an intermediate member articulated to each beam.

7. Device according to claim 1 wherein said set comprises guide means adapted to cause the set to be crushed along a predetermined crushing axis in the event of an impact.

8. Device according to claim 7 wherein said guide means comprise a slide member fastened to one beam at one end, and having an opposite end adapted to slide in a sheath coaxial with said slide member and fitted to the other beam.

9. Device according to claim 1 wherein said at least one set comprises a plurality of sets disposed in series, and wherein the sets are aligned in the direction of impact and fixed together.

10. Longitudinal compression and tension load transmission member for a railroad vehicle, said member consisting of a device according to claim 1.

11. A railroad vehicle chassis comprising a longitudinal compression and tension load transmission member according to claim 1.

* * * * *